United States Patent
Rao et al.

(10) Patent No.: US 8,345,536 B1
(45) Date of Patent: Jan. 1, 2013

(54) MULTICAST HIGH AVAILABILITY ENHANCEMENTS FOR NON-STOP FORWARDING

(75) Inventors: Srikanth Rao, Fremont, CA (US);
Viswanathan Raman, San Jose, CA (US)

(73) Assignee: Force10 Networks, Inc., San Jose, CA (US)

( * ) Notice: Subject to any disclaimer, the term of this patent is extended or adjusted under 35 U.S.C. 154(b) by 398 days.

(21) Appl. No.: 12/322,159

(22) Filed: Jan. 29, 2009

(51) Int. Cl.
*G01R 31/08* (2006.01)

(52) U.S. Cl. ........ 370/216; 370/217; 370/218; 370/219; 370/220

(58) Field of Classification Search .................. None
See application file for complete search history.

(56) References Cited

U.S. PATENT DOCUMENTS

| | | | | |
|---|---|---|---|---|
| 7,342,874 | B2 * | 3/2008 | Pegrum et al. | 370/218 |
| 7,447,225 | B2 * | 11/2008 | Windisch et al. | 370/428 |
| 7,535,826 | B1 * | 5/2009 | Cole et al. | 370/218 |
| 7,787,360 | B2 * | 8/2010 | Windisch et al. | 370/217 |

* cited by examiner

*Primary Examiner* — Robert Wilson
(74) *Attorney, Agent, or Firm* — Haynes and Boone, LLP (57) ABSTRACT

A distributed-forwarding router platform contains a master and a standby route processing manager (RPM). The master RPM uses dynamic internal routing codes to facilitate the replication of multicast packets within the router. As internal routing codes are assigned, the assignments are shared with the standby RPM. Should the standby RPM have to take over as the master RPM, the new master consults the internal routing codes assigned by the previous master as the new master builds multicast state, insuring that the internal routing codes the new master assigns are consistent with those used by the prior master. This allows the multicast forwarding plane to remain available during RPM failover, without a shutdown or unstable period while the new master RPM propagates internal routing codes. Other embodiments are also described and claimed.

14 Claims, 5 Drawing Sheets

MULTICAST HIGH AVAILABILITY ENHANCEMENTS FOR NON-STOP FORWARDING

BACKGROUND

1. Field of the Invention

The present disclosure relates generally to multicast data packet forwarding internal to a router or switch, and more particularly to router management failover behavior for multicast data packets.

2. Description of Related Art

Packet data routers (hereinafter "routers") are a well-known component of packet data networks. Packet data routers use routing protocols to discover shortest-path routes to (in an Internet-Protocol (IP) network) IP addresses, and then route packets received from neighboring devices toward their destination over the discovered routes. Many routers can also function as a switch for groups of their ports that connect to a common Local Area Network (LAN) or Virtual LAN.

A data packet may be a "unicast" packet, a "multicast" packet, or a "broadcast" packet. Unicast packets have a single source and a single destination. When a router receives a unicast packet, it simply forwards it toward the destination address stored in the packet. Broadcast packets are intended for distribution to all neighbors in a network—a router replicates such a packet and sends it out all ports on that network. A multicast packet typically has a distribution between that of a unicast packet and that of a broadcast packet. A multicast packet generally has a single source, but multiple receivers. Rather than having the source create multiple copies of the same packet, one addressed to each receiver, the source addresses one copy to a multicast group address. A router receiving such a packet determines which of its outgoing interfaces should receive a copy (or multiple copies, if the outgoing interface serves multiple VLANs that have endpoints that have each requested a copy), replicates the packet accordingly, and forwards it out the appropriate interfaces. This technique can avoid wasted bandwidth in a network by only replicating a multicast packet where two partially-shared receiver paths diverge.

In an IPv4 Multicast network, IP multicast packets are identified by a destination address in a defined range of IP addresses (address prefixes 224 to 239). A source "sends" a multicast packet to the group by placing a valid IP Multicast group address in the destination address field of an IP packet, without necessarily knowing the identities or number of the receivers. Receivers that are interested in receiving packets sent to that group use the IP Multicast group address to register their interest with a neighboring router, by sending an IGMP (Internet Group Management Protocol, see, e.g., Internet Engineering Task Force ("IETF") Request For Comments ("RFC") 3376, "Internet Group Management Protocol, Version 3," B. Cain et al., October 2002, incorporated herein by reference) packet to the router. In one common deployment, the router advertises the requested IP Multicast group address, in turn, to its neighbor routers, using PIM-SM packets (Protocol-Independent Multicast-Sparse Mode, see, e.g., IETF RFC 4601, "Protocol Independent Multicast—Sparse Mode (PIM-SM): Protocol Specification (Revised)," B. Fenner et al., August 2006, incorporated herein by reference). Neighbor routers work together with a Rendezvous Point router to establish delivery of the requested multicast packets to the interested receivers through either a "shared tree" that passes through the Rendezvous Point or a "source-specific tree" that may take a more direct path from the source to the receivers.

Figure 1:
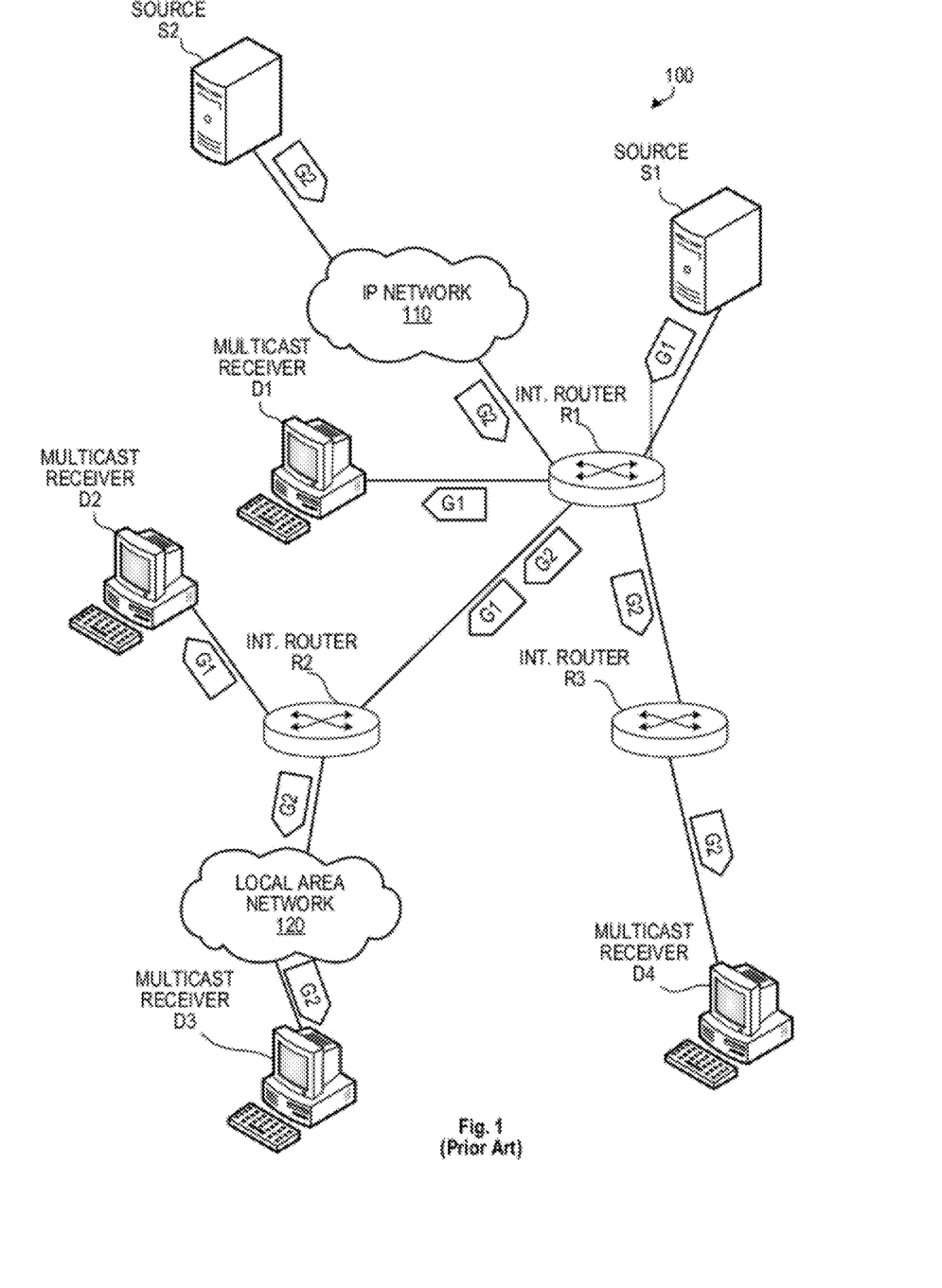
FIG. 1 shows an exemplary prior art IP multicast delivery network.

FIG. 1 shows a simplified network 100, with two multicast sources S1 and S2, four multicast receivers D1, D2, D3, and D4, and three intermediate routers R1, R2, and R3. Source S1 connects directly to R1, while source S2 connects to R1 through, e.g., and IP network 110. R1 also connects directly to routers R2 and R3, and to receiver D1. R2 also connects directly to receiver D2, and to receiver D3 through a local area network 120. R3 also connects directly to receiver D4.

Assume that receivers D1 and D2 wish to join a multicast group G1, with IP Multicast group address 239.168.1.1, and receivers D3 and D4 wish to join a multicast group G2, with IP Multicast group address 224.128.1.1. Each receiver sends an IGMP join group request packet to its closest router, indicating the desired IP Multicast group address and its own IP address as a requested multicast destination. Intermediate switches (not shown) within local area network 120 may "snoop" IGMP packets as they pass through the switch to learn of the request as well, but at this point the role of such switches is to simply forward the IGMP request to R2.

Each router uses PIM-SM join messages to advertise in turn to its adjacent routers that it is interested in the multicast groups requested by the receivers it serves. For instance, R3 sends a PIM-SM join message to R1, expressing interest in G2; R2 sends a PIM-SM join message to R1, also expressing interest in G2. R2 also sends another PIM-SM join message to R1, expressing interest in G1. R1 consolidates this information, and may forward PIM-SM join messages for both G1 and G2 toward a Rendezvous Point router (not shown) in IP network 110 (note that only one PIM-SM join message is sent by R1 for each group, even though R1 received two separate IGMP and/or PIM join messages for each multicast group).

Assume that S1 begins sending IP Multicast packets to R1, with the group G1 IP Multicast group address 239.168.1.1 as the IP destination address. R1 knows that it must send out two copies of these packets—one to D1, and one to R2. When R2 receives its copy, it forwards the IP Multicast packets to D2.

Assume also that a router within IP network 110 becomes aware that S2 is sending IP Multicast packets with the IP Multicast group address 224.128.1.1 as the IP destination address, and the same router knows that R1 (or an intermediate node) has expressed interest in that multicast group. A copy of the S2 multicast packets will be forwarded to R1. R1 knows that it must send out two copies of these packets as well—one to R2, and one to R3. When R2 receives its copy, it forwards the IP Multicast packets to LAN 120 for delivery to D3. When R3 receives its copy, it forwards the IP Multicast packets to D4.

IGMP receivers periodically repeat their IGMP requests to insure that they continue to receive multicast traffic, and can also notify the closest router that they no longer require traffic from a multicast group by issuing a leave group request. When a router does not receive any repeated requests from a receiver, the multicast route information for that receiver will eventually time out and the router will stop forwarding that multicast traffic to the receiver. When the receiver was the last one served by the router, the router will send a PIM prune message to its neighbor routers, notifying them that it no longer needs packets for that multicast group.

Other types of PIM exist, including a Dense Mode (see, e.g., IETF RFC 3973, incorporated herein by reference), a Source Specific Mode (see, e.g., IETF RFC 3569, incorporated herein by reference), and a Bidirectional Mode (see, e.g., IETF RFC 5015, incorporated herein by reference). Each uses a different method to create and manage a multicast distribution tree. Internal to a router, however, the router must still track the ports on which it must send out packets for each multicast group, no matter which PIM type is deployed.

BRIEF DESCRIPTION OF THE DRAWINGS

The present invention can be best understood by reading the specification with reference to the following Figures, in which.

DETAILED DESCRIPTION

Many routers are designed to handle multicast traffic in a "graceful" manner, e.g., the router cooperates with neighbor routers and only forwards multicast packets out a port that communicates with a device that has requested those packets. Internally, a distributed-forwarding router may also manage distribution of multicast packets in an efficient manner as well, e.g., multicast packets preferably are not flooded throughout the box and then dropped at the egress ports that do not need them. Otherwise, the distributed internal switching mechanisms of the router may be overwhelmed by a relatively small fraction of multicast traffic, decreasing router performance for all traffic unnecessarily.

One method of limiting internal flooding of multicast packets in a router is to only copy such packets to a limited internal group of destinations. The internal group includes all egress packet processors associated with one or more egress ports that require a copy of the multicast packet (for simplicity or efficiency, the internal group may also include one or more, but hopefully not many more, egress processors that will discard the multicast packet). This method is often implemented in practice by placing an internal "tag" header on a multicast packet with an internal routing code. The internal routing code describes, either via its contents or in conjunction with some lookup information, the internal distribution of the multicast packet.

It has now been recognized that, with regard to multicast traffic, several issues can arise in such a router when a route processor module (the component of the router that processes, e.g., IGMP, PIM, unicast routing protocols, etc., and programs the other elements of the router accordingly to forward data plane traffic) fails and route processing duties fail over to a standby route processor module. In this scenario, the standby route processor module may inadvertently interrupt active multicast flows through the router, or fail to establish newly requested multicast flows through the router for an extended time, even though the data forwarding plane remains fully functional during the route processing switchover.

Figure 2:
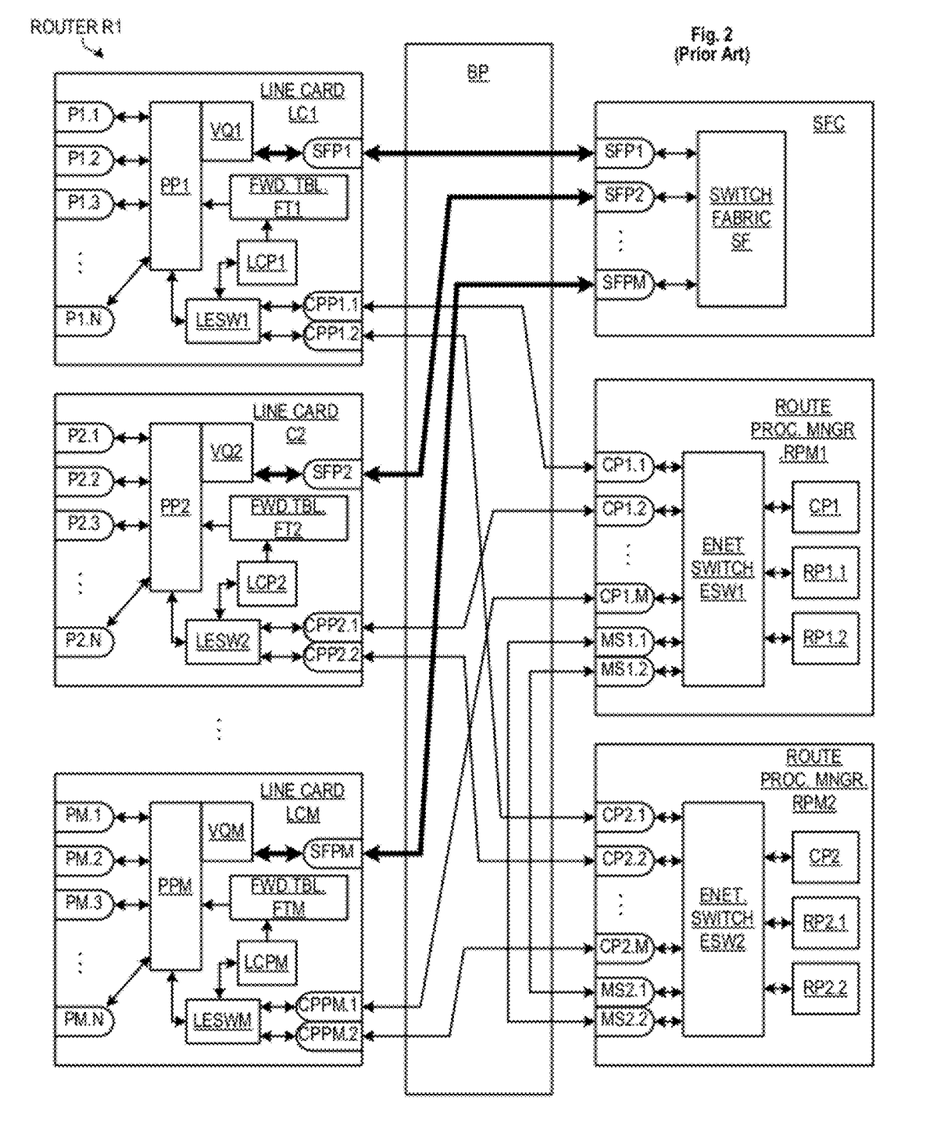
FIG. 2 contains a block diagram for a prior art modular router.

In order to illustrate the cause of these issues, further details of the operation of a prior art distributed router/switch R1 are presented in conjunction with the block diagram shown in FIG. 2. It is noted that although the router/switch itself is prior art, it is believed that no prior art appreciation of the problems addressed herein existed.

FIG. 2 shows several major components of a distributed-forwarding modular router R1, including three line cards LC1, LC2, LCM, a switch fabric card SFC, and two route processor manager cards RPM1 and RPM2, all connected across a backplane BP. Typical routers may have provisions for more than three line cards, with different numbers and types of external ports, and/or more than one switch fabric card, but the configuration shown in FIG. 2 is sufficient to illustrate the relevant concepts needed for an appreciation of the embodiments.

Line card LC1 is representative of the line cards shown in router R1. A number of external ports P1.1 to P1.N support external full duplex packet data links to other routers, switches, endpoints, etc. Packets that ingress or egress one of the external ports on LC1 are handled by a packet processor PP1. Packet processor PP1 comprises one or more integrated circuits that buffer packets, make add/drop decisions, perform any necessary updates to packets, replicate multicast packets, and make packet forwarding decisions based on forwarding tables stored in a forwarding table FT1, implemented using a Content Addressable Memory (CAM).

PP1 implements a plurality of Virtual Queues (VQ1) that buffer incoming data packets according to the internal destination of the packet and its priority. A unicast packet awaiting forwarding to another line card is buffered in a corresponding queue assigned to that line card and the packet's priority. The destination line card address and priority are stored in a tag header prepended to the packet by PP1. A multicast packet awaiting forwarding to a group of line cards is buffered in a queue corresponding to an internally-assigned Multicast Group Identifier (MGID), which PP1 stores in the tag header instead of the destination line card address. For instance, an MGID of "33" may be dynamically assigned to an internal distribution list including line cards LC2 and LCM, while an MGID of "34" may be dynamically assigned to an internal distribution list including line cards LC2 and LC3 (not shown).

Packets waiting in the various VQ1 queues are eventually dequeued and supplied to a switch fabric port SFP1 for forwarding to the appropriate destination line card(s) according to a schedule. In one embodiment, centralized scheduling and epoch-based switching are used to move data packets through the switch. Each line card informs a central scheduler (not shown) as to which of its virtual queues have data packets waiting to move through the switch fabric, and possibly the amount of data waiting, how long it has been waiting, etc. The central scheduler attempts to schedule as many line cards as possible each epoch to receive packet data, without starving one connection for too long. Accordingly, the central scheduler determines, for each epoch, which line cards are allowed to send packets, and for each line card allowed to send, to which line card (unicast) or line cards (multicast) the line card is allowed to send.

Each epoch, every line card sends data packets to at most one other line card or one MGID, as directed by the scheduler. Each epoch, every line card receives data packets from at most one other line card. The central scheduler programs the switch fabric card SFC to make the appropriate connections. SFC contains M full-duplex ports SFP1 to SFPM, each connected through backplane BP to a corresponding full-duplex port on one of the line cards. The line card transmits ingress packet data on one backplane conductor pair to the paired switch fabric port, while the switch fabric port transmits egress packet data on another backplane conductor pair to the paired line card port. Within SFC, data arriving on ports SFP1 to SFPM is supplied to a crossbar switch SF. The crossbar switch SF is programmed to direct the data arriving at each of the ports back to the appropriate one or more of the ports SFP1 to SFPM, according to the current schedule. For multicast packets, the crossbar SF is capable of connecting any combination of its outputs simultaneously to any specified input, effectively replicating the multicast packet in the crossbar switch. For each internal MGID, the crossbar switch is preprogrammed to know which connections to make in order to replicate the packet to the appropriate line cards, when so scheduled.

When line card LC1 receives packets from another line card via port SFP1, PP1 queues the packets for egress processing. Unicast packets are stripped of their tag header and directed to an output buffer connected to the appropriate egress port, P1.1 to P1.N. For multicast packets, PP1 reads an Egress Processing Index (EPI) from the tag header. The EPI was stored in the tag header by the ingress packet processor, as a result of the forwarding lookup performed on the packet. On each line card, the EPI is keyed to a set of replication instructions particular to that line card. These instructions specify the port or ports that are to receive copies of the multicast packet, whether a VLAN tag is required for each copy, and if so, the VLAN tag. PP1 replicates the packet as many times as necessary, modifies each copy as appropriate, and queues each copy in the appropriate port queues for transmission across the external links of the router.

In addition to the data forwarding plane that has been described above, router R1 also includes a control plane. The control plane handles routing and switching protocol exchanges with neighboring routers and switches, and configuration of the hardware and lookup tables on each line card to perform the desired data plane routing and switching behavior. Control plane components of router R1 include a line card processor LCPx and Ethernet switch LESWx on each line card x, the two route processor management cards RPM1 and RPM2, and control plane connections across backplane BP. The backplane control plane connections include a dedicated Ethernet connection between each line card LCPx and each RPM card RPMy, i.e., between a control plane port CPPx.y on line card LCPx and a control port CPy.y on RPM card RPMy.

Each route processing management card RPMy includes an Ethernet switch ESWy, a control processor CPy, two route processors RPy.1 and RPy.2, the line card control ports CPx.y, and two master/slave ports MSy.1 and MSy.2. The master/slave ports on the two RPMs are cross-connected, providing redundant communication paths between the two RPMs. The control processors CP1 and CP2 elect between themselves which RPM is to be the master RPM and which is to be the standby RPM. The standby RPM enters a state in which it monitors the health of the master RPM. The standby RPM remains in this state unless required to take over the master role due to, e.g., communication failure, loss of power, or removal of the elected master RPM.

On the master RPM, the control processor and route processors communicate with the other elements of the router, and with neighboring devices for protocol exchanges, through the Ethernet switch and the ports to the other elements. The control processor runs software that boots the chassis in an orderly fashion, generally configures and manages the chassis, monitors diagnostics, compiles statistics, provides remote configuration and monitoring capability for administrators, etc. The route processors split the load of handling routing and switching protocols.

When packet processor PP1 on line card LC1 receives a packet that is addressed to the router itself, the address instructions it looks up in FT1 will direct PP1 to address the packet to the appropriate route processor of the master RPM, and send the packet through the line card Ethernet switch LESW1. Conversely, the route processors can inject protocol packets back into the data stream by addressing them to PP1 (if the packet is to exit a port on LC1) and submitting them to the RPM Ethernet switch. Some protocols that are port-specific may also be handled by the line card processor LCP1, if desired. The line card processor LCP1 also connects to PP1 through Ethernet switch LESW1.

Through protocol exchanges with its neighbors, the master RPM builds master routing and forwarding tables for router R1. Portions of the routing and forwarding tables that are appropriate for each line card are shared with the line card processor on that line card. The line card processor maintains a local forwarding table, from which it updates the CAM forwarding table (FT1 in LC1, for instance).

From a multicast standpoint, the master RPM conducts IGMP and PIM exchanges with neighboring devices, and may also snoop IGMP packets that are switched through the device. The master RPM saves state for known IGMP-joined and PIM-joined multicast paths, and uses the state to build the internal multicast paths through the router. These internal paths include MGIDs, which are added to forwarding table entries and used to program the scheduler and switch fabric, and EPIs, which are also added to forwarding table entries. In addition, the EPIs are associated with particular ports and egress actions on the affected line cards for a multicast group. These ports and actions are programmed separately to each line card.

Should the master RPM fail, multicast protocol handling will be taken up by the standby RPM. The standby (now new master) RPM initiates a delay timer when it becomes master. The new master RPM will transmit IGMP and PIM hello messages on its ports, and begins relearning the multicast state that was lost when the previous master RPM failed. At the expiration of the timer, the new master RPM loads the new forwarding tables that it has built down to the line cards, which replace the forwarding table CAM entries with the new entries.

It has now been recognized that this failover process can create several undesirable side effects. First, during the delay time, no new multicast paths can become active, as the new master has no way to know that information it receives from a neighbor represents a multicast join that did not exist prior to the failover. Thus, all new multicast paths must wait for the entire delay time to pass before going active on the data forwarding plane. During this delay time, only the multicast forwarding information left over from the previous master exists in the data forwarding plane.

Perhaps even more serious, the new master RPM dynamically assigns MGIDs and EPIs for the multicast paths it learns in a way that may cause temporarily incorrect forwarding. In all likelihood, the new master will reuse some MGIDs and/or EPIs assigned by the old master RPM, but with completely different meanings than the MGIDs and EPIs dynamically assigned by the old master RPM. Thus as the forwarding tables, scheduler, and switch fabric are reprogrammed by the new master RPM, multicast packets passing through the router may, for a brief period of time, be forwarded incorrectly within the router. This may cause traffic loss for some multicast receivers, while other multicast receivers are sent packets that were not requested, until the forwarding tables, scheduler, switch fabric, and virtual queues all agree with each other again.

Several techniques have now been discovered to improve multicast forwarding performance upon failover of a route processing module. First, the original master RPM shares its dynamic MGID and EPI assignments with the standby RPM.

Upon failover, the new master RPM consults the shared MGID and EPI assignments as it learns multicast paths, and dynamically assigns these paths to the same MGIDs and EPIs as the prior master RPM. When the new master RPM reprograms the line card forwarding tables, scheduler, and switch fabric, most or all MGID and EPI assignments will still agree (barring prune and join activity to a preexisting multicast group assignment during the learning time). Also, if a PIM or IGMP join received by the new master does not match a multicast group assigned to an MGID or EPI by the previous master, it can be safely assumed that the join pertains to a new multicast group. In such a case, the new master RPM need not wait until the expiry of a delay timer to install new forwarding entries for that multicast group—it must only take care not to reuse any MGID or EPI that has not timed out of the shared assignment list from the previous master RPM.

This technique solves most of the RPM failover problems for internal multicast paths, without requiring the new master RPM to know the IGMP and PIM states of the old master RPM. For actively forwarded multicast groups, however, no changes (prunes or joins) to the group membership can propagate to the line cards, scheduler, and switch fabric until the expiry of the timer. A second technique has now been discovered to address this issue, for use as a standalone technique or in conjunction with the first technique. In the second technique, during initial formation of an adjacency two neighboring PIM speakers exchange, in their hello messages, information as to whether each supports a non-stop forwarding capability. When one of the PIM speakers subsequently experiences an RPM failover, the PIM neighbor senses this event, e.g., by sensing a new generation ID in the PIM packets received from the restarting PIM speaker. The PIM neighbor responds by immediately forwarding its entire relevant Tree Information Base (TIB) to the restarting PIM speaker, followed by an End Of TIB (EOTIB) marker. Once the restarting PIM speaker has received TIB contents and EOTIB markers from each of its PIM neighbors, it need not wait for the expiry of the delay timer before loading its forwarding entries to the line cards. In a group of routers participating in this non-stop forwarding capability, it may be possible to significantly reduce the configuration delay time currently required before purging stale multicast entries from the line card forwarding tables.

Figure 3:
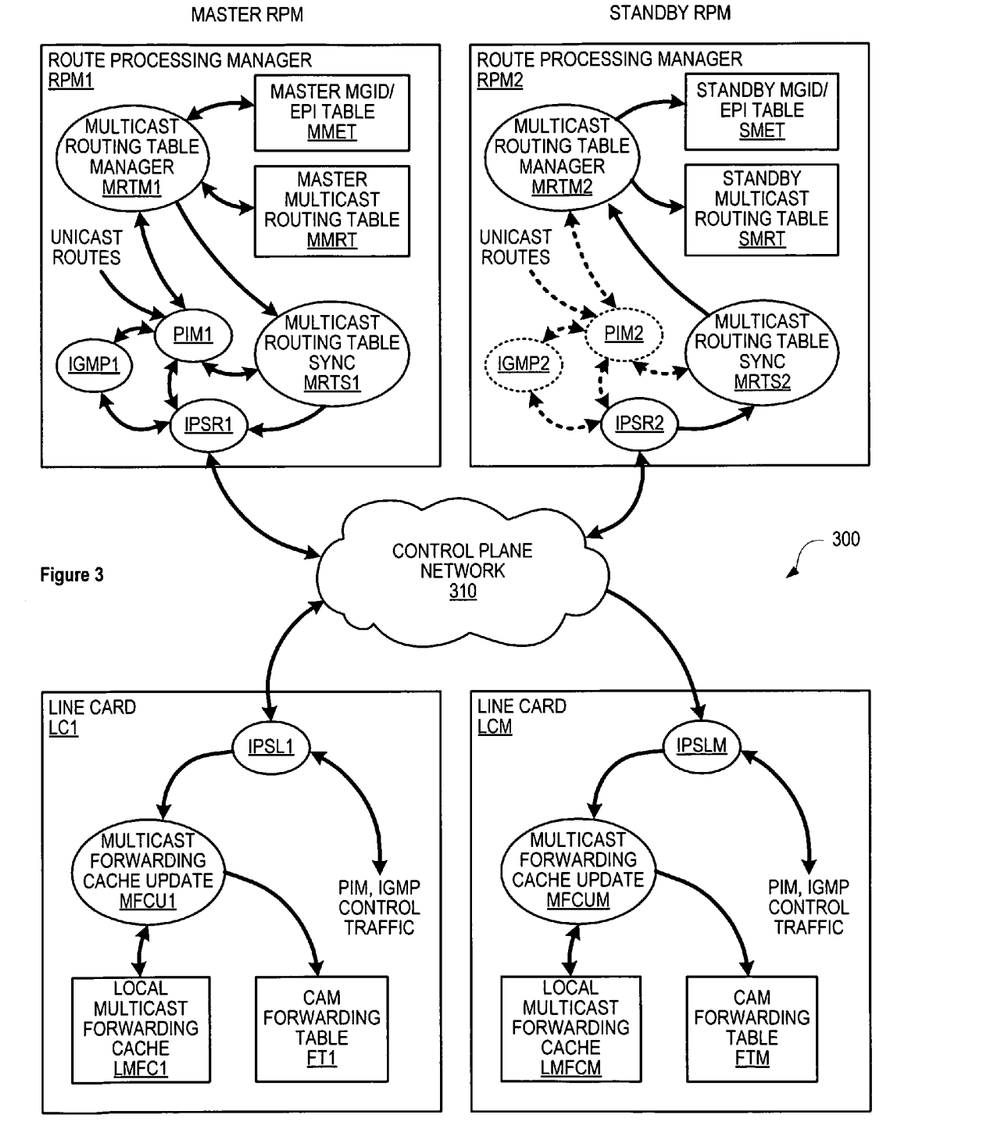
FIG. 3 contains a block diagram illustrating, for an embodiment, a set of multicast facilities deployed in a modular router.

FIG. 3 shows another, process-oriented, block diagram for a router 300 operating according to an embodiment. These processes can be mapped, e.g., to the hardware shown in FIG. 2, or to other hardware configurations that support redundant route processing modules. FIG. 3 illustrates two route processing managers, RPM1 and RPM2, two line cards LC1 and LCM, and a control plane network 310 that connects the RPMs and line cards. Within each RPM, "bubbles" in FIG. 3 indicate processes executed, e.g., by a route processor, and rectangles indicate a table or information base stored in memory adjacent a route processor. Within each line card, "bubbles" indicate processes executed, e.g., by a line card processor, and rectangles indicate a table stored in memory adjacent a line card processor. The processes and memory constructs pictured are those needed to discuss an embodiment—many other processes and memory constructs will exist in a typical system, but are omitted here for clarity.

Turning first to line card LC1, the line card executes a multicast forwarding cache update process MFCU1. Process MFCU1 receives multicast forwarding updates relevant to LC1 via an IP protocol stack IPSL1. IP protocol stack IPSL receives the multicast forwarding updates imbedded in IP control packets addressed to LC1 and forwarded from the master RPM. Stack IPSL removes the IP header from these packets, interprets the contents as forwarding updates, and sends them to process MFCU1. Process MFCU1 uses the updates to modify (add or purge) entries in a local multicast forwarding cache LMFC1 stored, e.g., in Random Access Memory (RAM). Cache LMFC1 also stores information allowing cache update process MFCU1 to locate the appropriate entry or entries in CAM forwarding table FT1 for forwarding or modification according to the forwarding updates. Once the forwarding updates are entered in FT1, they will affect the forwarding behavior of multicast data packets received by that line card.

The IPSL1 stack may also receive PIM and/or IGMP control traffic. This traffic may be received at a port on line card LC1, in which case it is forwarded across control plane network 310 to the current master RPM. The IPSL1 stack may also receive PIM and/or IGMP control traffic from the master RPM via the control plane network 310, in which case it is forwarded out the appropriate line card port towards an indicated neighboring device.

FIG. 3 shows route processing manager RPM1 acting as the master RPM. The master RPM operates an IP protocol stack IPSR1, an IGMP router process IGMP1, a PIM speaker process PIM1, a multicast routing table manager process MRTM1, and a multicast routing table sync process MRTS1. IP protocol stack IPSR1 forwards IGMP packets for IGMP1, PIM packets for PIM1, and multicast configuration update information for sync process MRTS1.

PIM process PIM1 maintains state for and exchanges TIB information with adjacent PIM speakers. Process PIM1 also receives notifications from IGMP process IGMP1, whenever process IGMP1 detects a change in multicast status of an IGMP device connected to or through the router. Such changes are noted in the local TIB and may cause PIM1 to issue PIM join/prune messages to its neighbors. PIM1 also has access to unicast routes learned by the router, from which it can select appropriate ports to, e.g., reach multicast sources. PIM1 manages state information for its network PIM peers and for the multicast sources and receivers served by multicast flows through the router. From this state information, PIM1 supplies multicast forwarding information to the multicast routing table manager MRTM1. Manager MRTM1 manages a multicast forwarding information base, including a master MGID/EPI table MMET and a master multicast routing table MMRT. Routing table MMRT describes multicast ingress and egress ports for multicast flows, e.g., indexed by multicast group address and source address, including the MGID and EPI assigned to the multicast flow. MGID/EPI table MMET describes, for each MGID, the line cards included in the distribution. For each MGID and line card, MGID/EPI table MMET describes the egress processing instructions needed to replicate and distribute packets for a multicast flow.

The multicast routing table sync process MRTS1 receives, from manager MRTM1, changes to tables MMRT and MMET that are to be distributed to the line cards. Each such change is communicated by sync process MRTS1 to the multicast forwarding cache update process on the appropriate line card or cards.

In embodiment 300, sync process MRTS1 has a further function. Sync process MRTS1 sends multicast routing information from tables MMRT and MMET to a sync process MRTS2 on the standby RPM, RPM2. Sync process MRTS2 supplies the routing information, in turn, to a multicast routing table manager MRTM2 for storage in a standby multicast routing table SMRT and a standby MGID/EPI table SMET. The standby RPM does not receive PIM or IGMP state information or construct table information independently—it merely caches multicast routing and MGID/EPI information computed by the master RPM.

Figure 4:
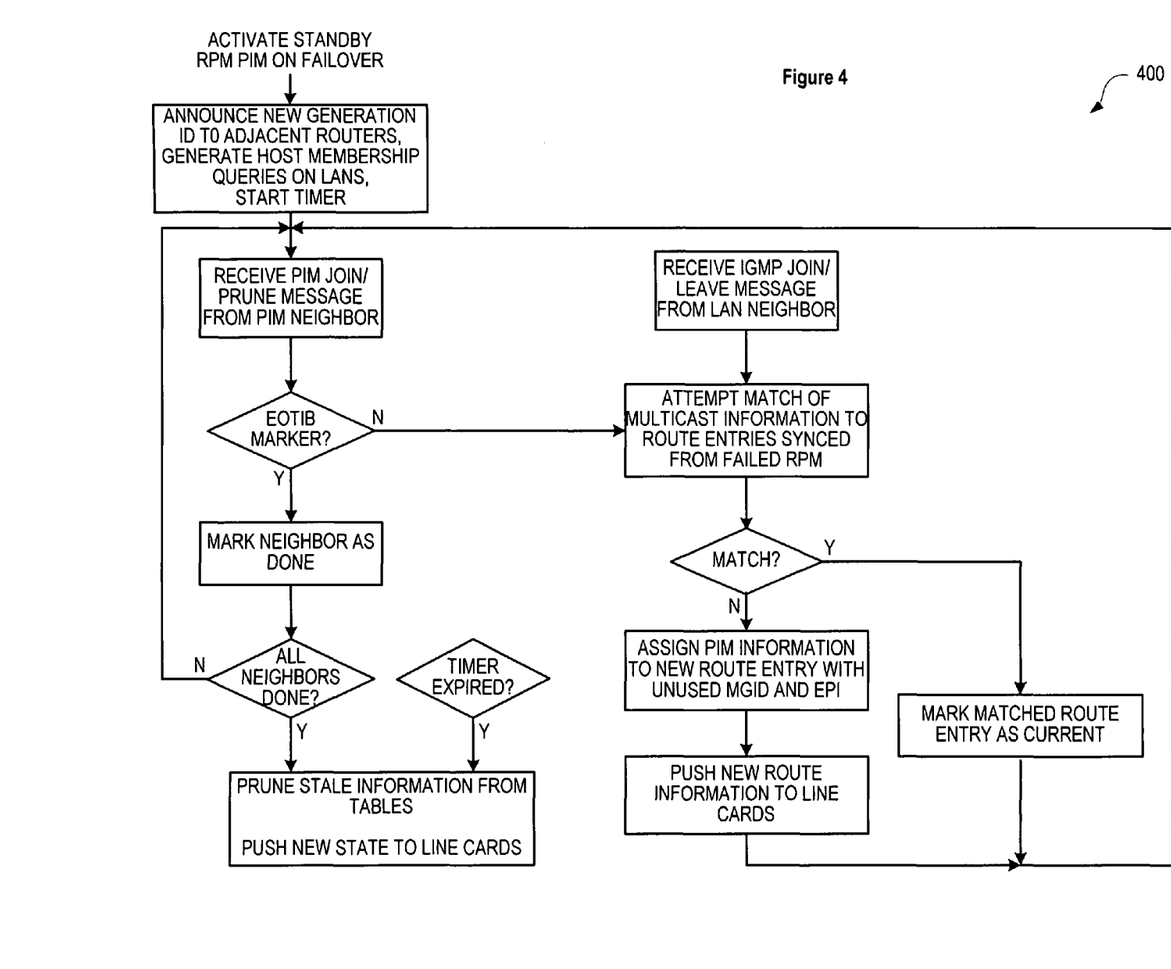
FIG. 4 contains a flowchart showing, for an embodiment, the multicast behavior of a router upon failover to a standby route processor.

FIG. 4 contains a flowchart 400 illustrating a multicast processing embodiment for the standby RPM when failover causes the standby RPM to become the master RPM. The new PIM process PIM2 and IGMP process IGMP2 are activated on RPM2 when RPM2 becomes the master. Upon activation, process PIM2 sends PIM "hello" messages to adjacent routers, including a generation ID that is different than the one previously advertised by the prior master RPM. This allows cooperating PIM speakers to know that the new master RPM is requesting a complete copy of the relevant TIB from each adjacent PIM speaker. At the same time, the new master RPM IGMP router process may also generate Host Membership Queries on its connected networks to solicit membership information from attached IGMP hosts. A configuration delay timer is then started.

The new master RPM waits for replies from adjacent PIM speakers and from connected IGMP hosts. When a PIM join/prune message is received from a PIM neighbor, the PIM process determines whether or not the message is intended as an EOTIB marker (e.g., the join/prune message is empty). If the message is not an EOTIB marker message, the PIM process accesses the standby multicast routing table SMRT to determine if the indicated egress port and multicast group address were also associated by the previous master RPM. If so, the route entry is marked as current (instead of as a standby entry) if the message is a join message. If the message is a prune message, the standby entry is removed, and the standby MGID and EPI entries are edited as necessary. If the message is a join message, and the multicast group address exists in the standby routes but is not associated with the egress port on which the join message was received, an entry is created, and the MGID and EPI entries already existing for the multicast group address are supplemented.

If the multicast group address in a received PIM join message does not exist in a standby entry (or a current entry), a new current route entry is created, and is created with an MGID and EPI that are unused by any standby entry. If desired, this new multicast route may be pushed directly to the affected line cards and scheduler, as the new RPM knows it will not cause an undesirable affect on any existing forwarding plane flows.

Similar steps are also followed to update the standby/current tables when IGMP messages are received (or snooped) during the initial configuration time.

When, instead of join/prune content, a received PIM message is empty, the message serves as an EOTIB marker. When an EOTIB marker is received, the PIM process marks the PIM speaker that sent the EOTIB marker as done with its updates. If other PIM speakers have not yet transmitted an EOTIB marker, the PIM process waits for further responses from those other speakers. If this PIM speaker is the last to send an EOTIB marker, however, the PIM process knows that it may now push its current routes to the line cards. Any remaining standby routes and associated MGIDs and EPIs are declared stale and pruned from the tables. Finally, the current multicast state is pushed to the line cards, and the PIM process begins normal master operation.

In the case that one PIM speaker is not provisioned to transmit EOTIB markers, such a marker is lost, or a speaker is extremely slow in sending updates, the delay timer will eventually expire. Expiry of the delay timer will also cause pruning of any remaining standby routes in the tables and a push of the current multicast state to the line cards.

The new multicast entries should now be internally consistent, MGID and EPI-wise, with those generated by the prior master RPM. As the previous multicast entries are replaced on each line card with the new multicast entries, then, deleterious effects are minimized, regardless of the timing of the updates propagating through the router. Further, if all neighboring PIM speakers cooperate in EOTIB behavior, the new multicast entries can be propagated to the line cards soon after the last PIM speaker responds.

Figure 5:
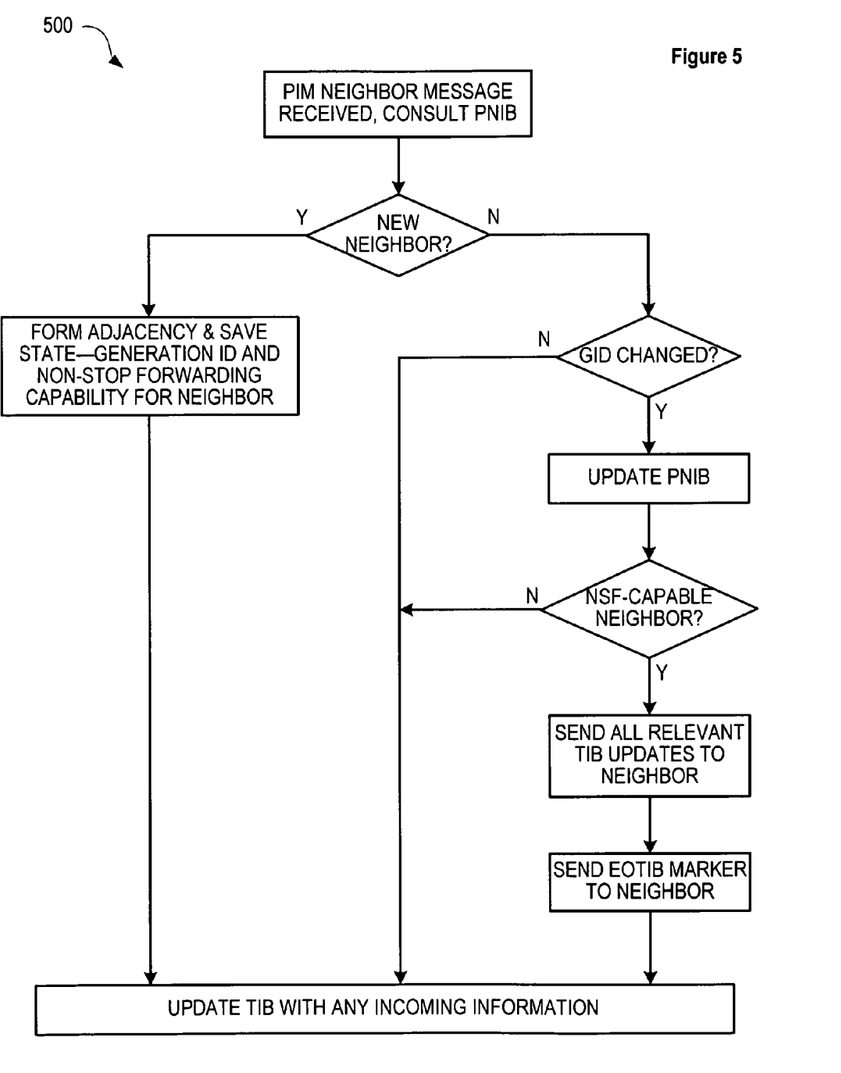
FIG. 5 contains a flowchart showing, for an embodiment, the multicast behavior of a neighbor router cooperating in a fast restart of a router that has failed over to a standby route processor.

FIG. 5 contains a flowchart 500 illustrating a process followed by a PIM speaker that cooperates in helping an adjacent router quickly restart PIM. Each such PIM speaker maintains a PIM neighbor information base (PNIB) in which is stores information about its PIM neighbors. When a PIM message is received from a neighbor, the PNIB is consulted to determine whether information has already been received from this neighbor. If the neighbor is "new", an adjacency is formed and state information about the PIM neighbor is stored, including, at a minimum, the neighbor's identity, a generation ID advertised by the neighbor, and an indication as to whether the neighbor is advertising a non-stop forwarding (NSF) capability. The tree information base (TIB) is also updated with any relevant information from the neighbor.

When a PIM message is received from a neighbor, and the neighbor does exist in the PNIB, the PIM speaker determines whether the neighbor's generation ID has changed. If so, the PNIB is updated. Further, if the neighbor is NSF-capable, the PIM speaker assumes that the neighbor is requesting immediate retransmission of all TIB information relevant to the neighbor. The PIM speaker responds by immediately sending all relevant TIB updates to the neighbor, followed by an EOTIB marker.

Conditions other than generation ID can also be used to trigger retransmission of TIB information. For instance, the PIM speaker may not hear from a PIM neighbor for an extended period of time—long enough that a liveliness timer for the neighbor expires. Rather than expunging the PIM neighbor's information from the PNIB, the entry can remain but be marked as expired. If the PIM neighbor subsequently reappears, all relevant TIB information can be retransmitted spontaneously, followed by an EOTIB marker. If the neighbor does not understand EOTIB markers, it can simply drop the marker packet, but will have all TIB information.

Those skilled in the art will appreciate that the embodiments and/or various features of the embodiments can be combined in ways other than those described. Other router platforms may use dynamic internal multicast routing codes other than the described MGID and EPI—such codes can also be tracked and made consistent across a failover event according to an embodiment. The use of PIM-SM and IGMP principles in the embodiments is merely exemplary—in a given embodiment, PIM variants other than PIM-SM can be supported, and multicast protocols other than PIM and IGMP can be supported. A given embodiment can enforce a minimum multicast convergence time upon failover, even if all known PIM neighbors have responded with EOTIB messages, to allow for IGMP convergence. The particular arrangement of router components, scheduling, control, and data paths are exemplary, and can be implemented in many other ways in an embodiment.

Although the specification may refer to "an", "one", "another", or "some" embodiment(s) in several locations, this does not necessarily mean that each such reference is to the same embodiment(s), or that the feature only applies to a single embodiment.

What is claimed is:
1. A router, comprising:
a backplane;

a standby route processor management card coupled to the backplane; and a master route processor management card coupled to the backplane, wherein the master route processor management card is operable to configure internal multicast data paths through the router, each internal multicast data path having at least one associated internal routing code corresponding to the internal multicast data path and at least one associated multicast group address; and wherein the master route processor management card is also operable to transmit internal routing code updates to the standby route processor management card, the internal routing code updates informing the standby route processor management card as to associations between internal multicast data paths, internal routing codes, and multicast group addresses.

2. The router of claim 1, wherein at least some of the internal routing codes comprise a multicast group identifier used to tag multicast data packets for internal transmission within the router, the multicast group identifier associated with a list of line cards in the router that are to receive a copy of a data packet internally tagged with the multicast group identifier.

3. The router of claim 1, wherein at least some of the internal routing codes comprise an egress processing index used to tag multicast data packets for internal transmission within the router, the egress processing index associated, for at least one line card in the first router, with a list of ports on that line card that receive a copy of a data packet internally tagged with the egress processing index.

4. A method for switching between a master route processor manager and a standby route processor manager, comprising:

maintaining, on the master route processor manager, multicast state information for multicast group traffic paths traversing at least one port of a first router on which the master route processor manager operates;

maintaining a first internal routing code table comprising at least one internal routing code for each multicast group address for which data packets are duplicated in the first router, the internal routing code, for each such multicast group address, associated with the multicast group traffic paths that multicast data packets traverse through the first router;

copying, to a second internal routing code table local on a standby route processor manager, the internal routing codes stored in the first routing code table, and an association between the internal routing codes, the multicast group addresses served by the internal routing codes, and the traffic paths that data packets traverse through the first router for the internal routing codes; and upon cessation of the operation of the master route processor manager as a multicast speaker, operating the standby route processor manager as the multicast speaker for the first router, the standby route processor manager using multicast neighbor router communications to construct multicast state information for multicast group traffic paths traversing at least one port of the first router, and the standby route processor manager reusing, for multicast group addresses saved in the second internal routing code table, the same internal routing codes associated with those multicast group addresses in the first internal routing code table.

5. The method of claim 4, wherein the internal routing codes copied to the second internal routing code table for a given multicast group address are further associated with a specific multicast source.

6. The method of claim 4, wherein the internal routing codes copied to the second internal routing code table for a given multicast group comprise a multicast group identifier, the multicast group identifier associated with a list of line cards in the first router that are to receive a copy of a data packet tagged with the multicast group identifier.

7. The method of claim 4, wherein the internal routing codes copied to the second internal routing code table for a given multicast group comprises an egress processing index, the egress processing index associated, for at least one line card in the first router, with a list of ports that receive a copy of a data packet tagged with the egress processing index.

8. The method of claim 7, wherein the list of ports further specifies, for at least one port in the list, a virtual local area network identifier to be inserted in a copy of the data packet to be forwarded out the at least one port.

9. The method of claim 8, further comprising, when an egress processing index assigned by the first route processor management card is reused by the second route processor management card, transmitting the egress processing index and associated port information to a processor local to a group of egress ports, wherein the transmitting is delayed for a time after the second route processor management card takes over for the first route processor module.

10. The method of claim 4, wherein at the end of an initial configuration period after the second route processor management card takes over for the first route processor management card, the second route processing management card removes internal routing code entries from the second internal routing code table that were copied from first routing code table but do not correspond to multicast state information constructed by the second route processor management card.

11. The method of claim 10, wherein the initial configuration period ends upon the expiry of a tinier set to allow a set configuration time.

12. The method of claim 10, wherein the initial configuration period ends after the at least one multicast neighbor router indicates that it has communicated all current multicast information to the second route processor management card.

13. The method of claim 4, further comprising, when the second route processor management card receives, during an initial configuration period, multicast state information for a new multicast group traffic path that does not correspond to any multicast group address copied to the second internal routing code table from the first internal routing code table, creating a new multicast group traffic path internal routing code, for the new multicast group traffic path, that does not reuse an internal routing code copied from the first internal routing code table.

14. The method of claim 13, further comprising installing the new internal routing code in a data forwarding path of the first router without waiting for the end of the initial configuration period.

* * * * *